United States Patent
Ouchi

(10) Patent No.: US 7,137,890 B2
(45) Date of Patent: Nov. 21, 2006

(54) MODIFYING GAME IMAGE FROM WIDE TO NORMAL SCREEN USING MOVING OR EYE DIRECTION OF CHARACTER

(75) Inventor: Satoru Ouchi, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 465 days.

(21) Appl. No.: 09/937,777

(22) PCT Filed: Feb. 15, 2001

(86) PCT No.: PCT/JP01/01070

§ 371 (c)(1),
(2), (4) Date: Oct. 1, 2001

(87) PCT Pub. No.: WO01/61679

PCT Pub. Date: Aug. 23, 2001

(65) Prior Publication Data

US 2003/0096647 A1  May 22, 2003

(30) Foreign Application Priority Data

Feb. 16, 2000 (JP) ............................... 2000-38507

(51) Int. Cl.
*A63F 13/00* (2006.01)
(52) U.S. Cl. ....................................................... 463/30
(58) Field of Classification Search ................ 348/556, 348/441, 445, 454, 455, 558, 806, 469, 581; 463/30–33; 345/7; 273/459–460
See application file for complete search history.

(56) References Cited

U.S. PATENT DOCUMENTS

| | | | | |
|---|---|---|---|---|
| 4,953,025 A | * | 8/1990 | Saitoh et al. | 348/445 |
| 5,045,939 A | * | 9/1991 | Okayama et al. | 348/445 |
| 5,223,929 A | * | 6/1993 | Sugimori et al. | 348/469 |
| 5,309,234 A | * | 5/1994 | Kranawetter et al. | 348/473 |
| 5,400,077 A | * | 3/1995 | Cookson et al. | 348/556 |
| 5,461,431 A | * | 10/1995 | Takebuchi et al. | 348/806 |
| 5,539,470 A | * | 7/1996 | Fukuoka et al. | 348/434.1 |
| 5,548,346 A | * | 8/1996 | Mimura et al. | 348/738 |
| 5,574,567 A | * | 11/1996 | Cookson et al. | 386/46 |
| 5,581,304 A | * | 12/1996 | Wang | 348/558 |
| 5,719,636 A | * | 2/1998 | Ishii et al. | 348/558 |
| 5,896,177 A | * | 4/1999 | Hwang | 348/445 |
| 5,907,659 A | * | 5/1999 | Yamauchi et al. | 386/95 |
| 5,914,754 A | * | 6/1999 | Kori et al. | 348/455 |

(Continued)

FOREIGN PATENT DOCUMENTS

EP    0 979 007 A2    2/2000

(Continued)

*Primary Examiner*—John M. Hotaling, II
(74) *Attorney, Agent, or Firm*—Oliff & Berridge, PLC

(57) ABSTRACT

A game apparatus, a storage medium, a transmission medium and a program correspond to a normal screen and a wide screen. An image generation unit 150 comprises a wide image data generation unit 152, an image data conversion unit 160 and a rendering unit 154. At first, the wide image data generation unit 152 generates image data viewed from a predetermined viewpoint in an object space, as image data corresponding to the wide screen. Then, the image data conversion unit 160 performs a processing of generating image data corresponding to the normal screen, on the basis of generated wide image data. The rendering unit 154 performs a rendering processing to the generated wide image data or the generated normal image data, and finally generates an image displayed on a display unit 20.

14 Claims, 11 Drawing Sheets

CENTER

U.S. PATENT DOCUMENTS 5,956,092 A * 9/1999 Ebihara et al. ............. 348/445
6,011,526 A * 1/2000 Toyoshima et al. ............ 345/7
6,043,483 A * 3/2000 Schreiber ............... 250/231.13
6,064,445 A * 5/2000 Kim et al. .................. 348/581
6,285,381 B1 * 9/2001 Sawano et al. ............. 715/726

FOREIGN PATENT DOCUMENTS

| | | | |
|---|---|---|---|
| JP | 2-226295 A | 9/1990 |
| JP | 6-284389 A | 10/1994 |
| JP | 6-308936 A | 11/1994 |
| JP | 9-116831 A | 5/1997 |
| JP | 10-162133 A | 6/1998 |
| JP | 11-143440 A | 5/1999 |

* cited by examiner

CENTER

MODIFYING GAME IMAGE FROM WIDE TO NORMAL SCREEN USING MOVING OR EYE DIRECTION OF CHARACTER

TECHNICAL FIELD

The present invention relates to a game apparatus and so on, for displaying game images on various types of display units in various aspect ratios.

BACKGROUND ART

According to an earlier development, a game apparatus conventionally generates game images for a television or a monitor (it will be typically called TV, in the following) in an aspect ratio of four to three (through the present specification, a screen in the aspect ratio of four to three will be called a normal screen).

However, the screen represented by a HDTV (High Definition Television) or an EDTV (Extended Definition Television), through which television programs are broadcasted, has the aspect ratio of sixteen to nine (the screen in the aspect ratio of sixteen to nine will be called a wide screen, in the following). Therefore, in case players enjoy playing a game with a conventional game apparatus and the TV with the wide screen, connected to the game apparatus, because the image of the normal screen is displayed on the wide screen, the image which is laterally enlarged (or which is longitudinally reduced) and distorted, is displayed.

Accordingly, at present wherein the television broadcast is changing to that for the HDTV or the EDTV, in further it is anticipated that the demand of the TV with the normal screen decreases. As a result, it is necessary that the game apparatus generates and outputs game images corresponding to the wide screen.

Further, at present wherein the TV with the normal screen and the TV with the wide screen coexist, it is desired that the game apparatus generates and outputs game images corresponding to the normal screen as well as game image corresponding to the wide screen.

It is an object of the present invention to provide a game apparatus and so on, corresponding to the normal screen and the wide screen.

DISCLOSURE OF THE INVENTION

In accordance with a first aspect of the present invention, a game apparatus comprises: a first generating section (for example, a wide image data generation unit 152 in FIG. 2) for generating game image data (for example, wide image data in the preferred embodiment) corresponding to a wide screen; and a second generating section (for example, an image data operation unit 164 in FIG. 2) for reducing or enlarging the game image data generated by the first generating section, to generate game image data (for example, normal image data in the preferred embodiment) with no distortion corresponding to a normal screen.

In accordance with a second aspect of the present invention, in a computer-readable storage medium having a program recorded thereon, for generating image data, the program comprises: a first generating program code (for example, a wide image data generation program 34 in FIG. 2) of generating game image data corresponding to a wide screen; and a second generating program code (for example, an image data conversion program 36 in FIG. 2) of reducing or enlarging the game image data generated by the first generating program code, to generate game image data with no distortion corresponding to a normal screen.

In accordance with a third aspect of the present invention, in a transmission medium transmitting a program for generating image data, the program comprises: a first generating program code (for example, a wide image data generation program 34 in FIG. 2) of generating game image data corresponding to a wide screen; and a second generating program code (for example, an image data conversion program 36 in FIG. 2) of reducing or enlarging the game image data generated by the first generating program code, to generate game image data with no distortion corresponding to a normal screen.

In accordance with a fourth aspect of the present invention, a computer program comprises program codes for performing: a first generating means for generating game image data corresponding to a wide screen; and a second generating means for reducing or enlarging the game image data generated by the first generating means, to generate game image data with no distortion corresponding to a normal screen.

According to the game apparatus, the storage medium, the transmission medium or the computer program in accordance with the first, second, third or fourth aspect of the present invention, it is possible to generate not only game images corresponding to the wide screen, but also game images with no distortion corresponding to the normal screen.

Herein, as a method of reducing or enlarging game image data, for example, a method of converting X-direction elements or Y-direction elements of image data by a conversion matrix is given.

In accordance with a fifth aspect of the present invention, a game apparatus comprises: a first generating section (for example, a wide image data generation unit 152 in FIG. 2) for generating game image data corresponding to a wide screen; and a second generating section (for example, an image position decision unit 162 in FIG. 2) for extracting game image data corresponding to a normal section, from the game image data generated by the first generating section, to generate game image data with no distortion corresponding to the normal screen.

In accordance with a sixth aspect of the present invention, in a computer-readable storage medium having a program recorded thereon, for generating image data, the program comprises: a first generating program code of generating game image data corresponding to a wide screen; and a second generating program code of extracting game image data corresponding to a normal section, from the game image data generated by the first generating program code, to generate game image data with no distortion corresponding to the normal screen.

In accordance with a seventh aspect of the present invention, in a transmission medium transmitting a program for generating image data, the program comprises: a first generating program code of generating game image data corresponding to a wide screen; and a second generating program code of extracting game image data corresponding to a normal section, from the game image data generated by the first generating program code, to generate game image data with no distortion corresponding to the normal screen.

In accordance with an eighth aspect of the present invention, a computer program comprises program codes for performing: a first generating means for generating game image data corresponding to a wide screen; and a second generating means for extracting game image data corresponding to a normal section, from the game image data generated by the first generating means, to generate game image data with no distortion corresponding to the normal screen.

According to the game apparatus, the storage medium, the transmission medium or the computer program in accordance with the fifth, sixth, seventh or eighth aspect of the present invention, it is possible to generate image data corresponding to the wide screen, and also to generate image data corresponding to the normal screen.

Herein, because the game image data corresponding to the normal screen is extracted from the game image data corresponding to the wide screen, a game image on the normal screen is fixed. However, because the game image data corresponding to the wide screen is generated, the game image may be scrollable laterally on the normal screen.

Preferably, according to the game apparatus as described above, the second generating section generates the game image data (for example, FIG. 5) corresponding to the normal screen, from the game image data generated by the first generating section, according to a position, a moving direction or an eyes direction of a character (for example, a motorcycle (a moving object) in the preferred embodiment) controlled by a player in the game image data generated by the first generating section.

Preferably, according to the storage medium having the program recorded thereon, as described above, the program further comprises: a program code of generating the game image data corresponding to the normal screen, from the game image data generated by the first generating program code, according to a position, a moving direction or an eyes direction of a character controlled by a player in the game image data generated by the first generating program code.

Preferably, according to the computer program as described above, the second generating means generates the game image data corresponding to the normal screen, from the game image data generated by the first generating means, according to a position, a moving direction or an eyes direction of a character controlled by a player in the game image data generated by the first generating means.

According to the game apparatus, the storage medium or the computer program as described above, it is possible to obtain an effect, for example, that in case the moving direction of the character controlled by the player is right, the game image data broadening a right view field of the character controlled by the player is generated, and in case the moving direction is left, the game image data broadening a left view field is generated. As a result, it is possible to obtain images with a presence even if the screen displaying the images thereon is the normal screen.

Further, because the game image data corresponding to the normal screen is generated according to the position of the character controlled by player, it is possible to avoid a trouble the character controlled by the player is getting out of sight, caused by the normal screen.

Preferably, according to the game apparatus as described above, the second generating section extracts game data display data from the game image data generated by the first generating section, to generate the game image data (for example, FIG. 11) corresponding to the normal screen.

Preferably, according to the storage medium having the program recorded thereon, as described above, the program further comprises: a program code of extracting game data display data from the game image data generated by the first generating program code, to generate the game image data corresponding to the normal screen.

Preferably, according to the computer program as described above, the second generating means extracts game data display data from the game image data generated by the first generating means, to generate the game image data corresponding to the normal screen.

Herein, the game data display data means an information of a game while the game is executed, for example, in a racing game, a speed, a lap time and so on, of a moving object controlled by a player, and in a roll playing game or an adventure game, a position, a life time and so on, of a character controlled by a player.

According to the game apparatus, the storage medium or the computer program as described above, because the game image data corresponding to the normal screen can be generated by extracting the game data display data from the game image data corresponding to the wide screen, it is possible to easily generate the game image data corresponding to the wide screen or the normal screen according as the game data display data is included in the image data or not.

Herein, the game data display data may be put on the game image data, to be displayed on the normal screen.

In accordance with a ninth aspect of the present invention, a game apparatus comprises: a first generating section (for example, a wide image data generation unit 152 in FIG. 2; FIG. 10) for generating game image data in a letter box form corresponding to a normal screen; and a second generating section for extracting blank image data from the game image data generated by the first generating section, to generate game image data with no distortion corresponding to a wide screen.

In accordance with a tenth aspect of the present invention, according to a computer-readable storage medium having a program recorded thereon, for generating image data, the program comprises: a first generating program code of generating game image data in a letter box form corresponding to a normal screen; and a second generating program code of extracting blank image data from the game image data generated by the first generating program code, to generate game image data with no distortion corresponding to a wide screen.

In accordance with a eleventh aspect of the present invention, according to a transmission medium transmitting a program for generating image data, the program comprises: a first generating program code of generating game image data in a letter box form corresponding to a normal screen; and a second generating program code of extracting blank image data from the game image data generated by the first generating program code, to generate game image data with no distortion corresponding to a wide screen.

In accordance with a twelfth aspect of the present invention, a computer program comprises program codes for performing: a first generating means for generating game image data in a letter box form corresponding to a normal screen; and a second generating means for extracting blank image data from the game image data generated by the first generating means, to generate game image data with no distortion corresponding to a wide screen.

According to the game apparatus, the storage medium, the transmission medium or the computer program in accordance with the ninth, tenth, eleventh or twelfth aspect of the present invention, it is possible to generate the game image with the same view angle if the screen displaying the game image thereon is the normal screen or the wide screen.

Preferably, according to the game apparatus in accordance with the first, fifth or ninth aspect of the present invention, the game apparatus further comprises: a switching section for switching between the game image data generated by the first generating section and the game image data generated by the second generating section, to output either the game image data generated by the first generating section or the game image data generated by the second generating section.

Preferably, according to the storage medium having the program recorded thereon, in accordance with the second, sixth or tenth aspect of the present invention, the program further comprises: a switching program code of switching between the game image data generated by the first generating program code and the game image data generated by the second generating program code, to output either the game image data generated by the first generating program code or the game image data generated by the second generating program code.

Preferably, according to the computer program in accordance with the fourth, eighth or twelfth aspect of the present invention, the computer program further comprises a program code for performing: a switching means for switching between the game image data generated by the first generating means and the game image data generated by the second generating means, to output either the game image data generated by the first generating means or the game image data generated by the second generating means.

According to the game apparatus, the storage medium or the computer program as described above, because the game image data can be switched as the occasion may demand or voluntary, it is possible to improve its convenience.

Preferably, according to the game apparatus as described above, the switching section automatically switches the game image data to be outputted, according to a signal outputted from a predetermined display section.

According to the game apparatus as described above, because the game image data to be outputted can be automatically switched according as the display section has the wide screen or the normal screen, it is possible to realize the game apparatus which a player can use easily.

Preferably, according to the game apparatus as described above, the switching section switches the game image data to be outputted, according to a type or a state of a progress of a game.

Preferably, according to the storage medium having the program recorded thereon, as described above, the switching program code comprises a program code of switching the game image data to be outputted, according to a type or a state of a progress of a game.

Preferably, according to the computer program as described above, the switching means switches the game image data to be outputted, according to a type or a state of a progress of a game.

According to the game apparatus, the storage medium or the computer program as described above, because the game image data can be changed according to the state of the program of the game, for example, the game image data to be outputted can be switched to intentionally lead the operation of the character difficult, it is possible to realize a more interesting game.

Preferably, the game apparatus as described above, further comprises: an adjusting section for adjusting a brightness of the game image data generated by the second generating section, on the basis of the game image data generated by the first generating section.

Preferably, according to the storage medium having the program recorded thereon, as described above, the program further comprises: a program code of adjusting a brightness of the game image data generated by the second generating program code, on the basis of the game image data generated by the first generating program code.

Preferably, the computer program as described above, further comprises a program code for performing: an adjusting means for adjusting a brightness of the game image data generated by the second generating means, on the basis of the game image data generated by the first generating means.

According to the game apparatus, the storage medium or the computer program as described above, it is possible to adjust the unbalanced brightness of the normal screen when the game image data corresponding to the normal screen is generated.

Preferably, the game apparatus as described above, further comprises: an external output section for outputting the game image data generated by the first generating section or the game image data generated by the second generating section, to a predetermined external display section (for example, a relay monitor) connected to the game apparatus.

According to the game apparatus as described above, it is possible to obtain the same effect on a relay monitor or the like different from the display section displaying the game image thereon for the player, as the effect obtained on the game apparatus.

PREFERRED EMBODIMENT OF THE INVENTION

Hereinafter, a preferred embodiment of the present invention will be explained with reference to figures, as follows. Although the case the present invention executes a motorcycle racing game will be explained as an example, the present invention is not limited to the case.

Figure 1:
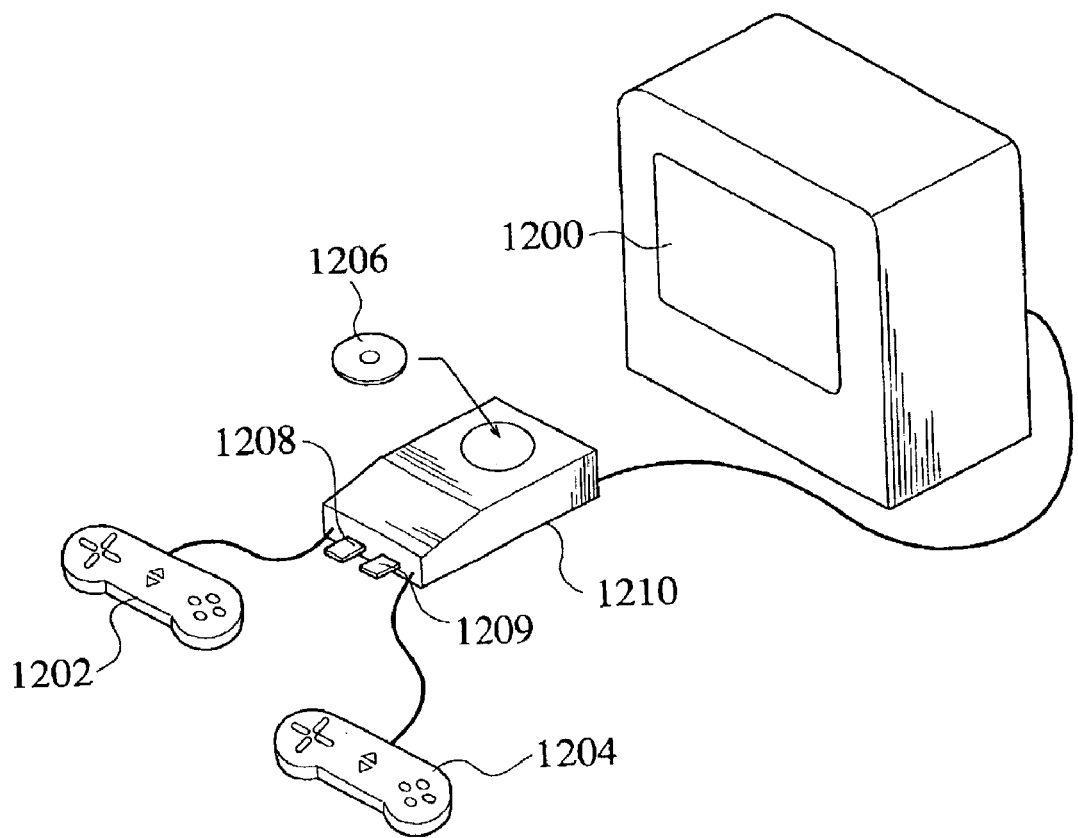
FIG. 1 is a view showing an exemplary case the present invention is applied to a consumer game machine.

FIG. 1 is a view showing an exemplary case the present invention is applied to a consumer game machine.

In FIG. 1, a player can enjoy controlling a virtual motorcycle (moving object) by operating a game controller 1202 or 1204 as watching game images displayed on a display 1200, and playing the motorcycle racing game of competing with motorcycles controlled by a computer and so on for the precedence.

At the above-described time, when the screen of the display 1200 is a wide screen, the game apparatus generates game images corresponding to the wide screen, while when the screen of the display 1200 is a normal screen, the game apparatus generates game images corresponding to the normal screen. As a result, the game images with no distortion corresponding to the screen size of the display 1200 can be displayed on the display 1200. Hereinafter, the method realizable of the above-described game images will be explained in detail.

Further, the data executable of the game, such as a game program and so on is stored in a data storage medium attachable to and detachable from an apparatus body, for example, a CD-ROM 1206, an IC card 1208, a memory card 1209 and so on.

Figure 2:
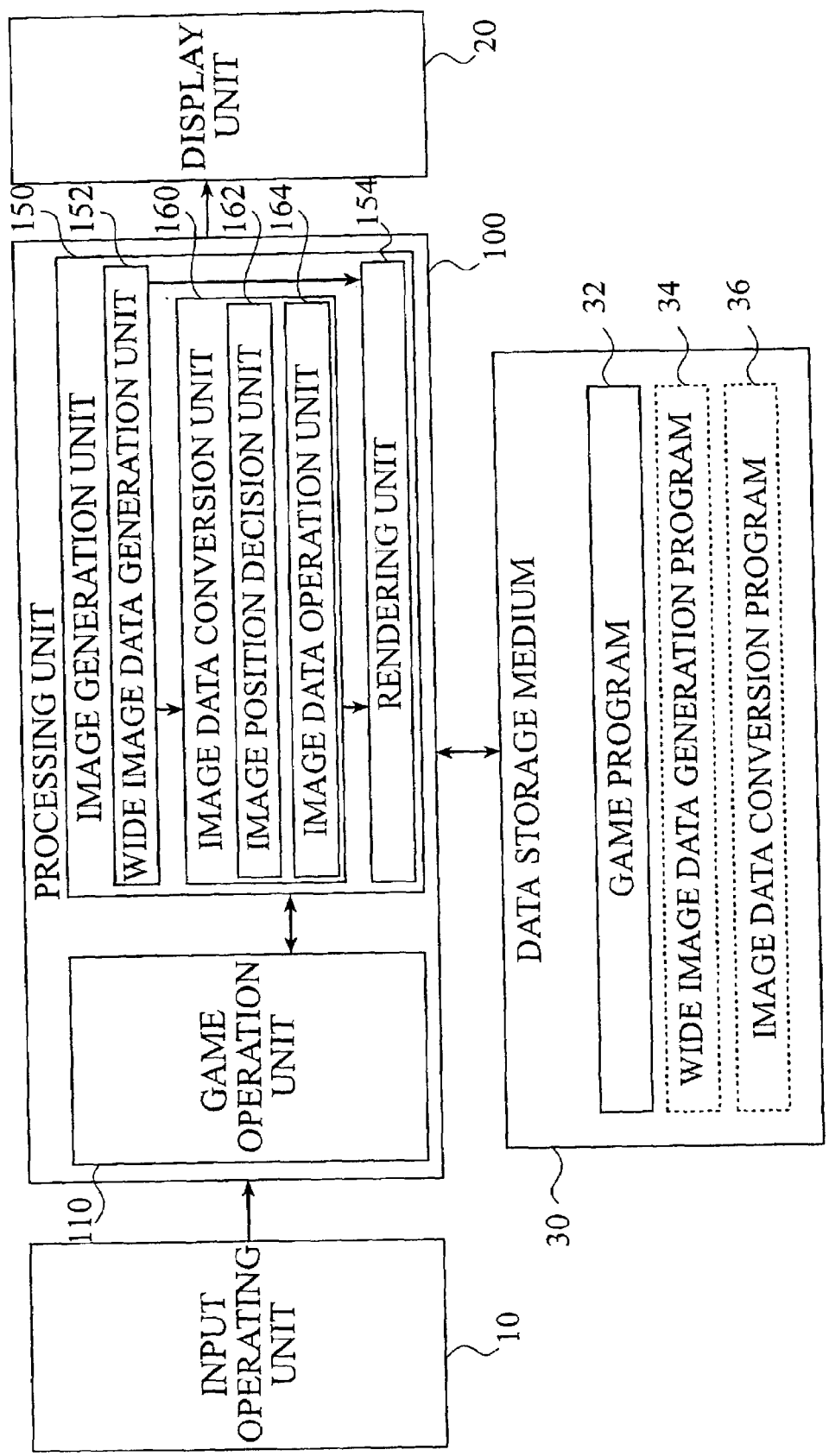
FIG. 2 is a diagram showing an exemplary functional block of the consumer game machine according to a preferred embodiment of the present invention.

FIG. 2 shows an example of a functional block diagram of the consumer game machine according to a preferred embodiment of the present invention. The functional block comprises an input operating unit 10, a processing unit 100, a display unit 20, and a data storage medium 30.

The input operating unit 10 corresponds to the game controllers 1202 and 1204 shown in FIG. 1. When any button or the like is pushed the input operating unit 10 outputs an operation signal to the processing unit 100.

The processing unit 100 performs a processing of arranging objects in an object space and a processing of generating images viewed from a predetermined viewpoint in the objects space, on the basis of the above-described operation signal, a game program 32 stored in the data storage medium 30 and so on. The processing unit 100 has functions realizable by hardware such as a CPU (CISC (Complex Instruction Set Computer) type, RISC (Reduced Instruction Set Computer) type), a DSP (Digital Signal Processor), an ASIC (Application Specific Integrated Circuit) (a gate array and so on), a memory and so on.

The processor unit 100 comprises a game operation unit 110 and an image generation unit 150. The game operation unit 110 performs a processing of progressing the game, a processing of arranging objects and a moving object in the object space, and so on.

The image generation unit 150 performs a processing of generating images viewed from the predetermined viewpoint in the object space set by the game operation unit 110, and the generated images are displayed on the display unit 20. Generating images, the image generation unit 150 generates images in the aspect ratio of the display unit 20.

That is, the image generation unit 150 comprises a wide image data generation unit 152, an image data conversion unit 160, and a rendering unit 154. At first, the wide image data generation unit 152 generates image data viewed from the predetermined viewpoint in the object space, such that the image data (the image data will be called wide image data, in the following) is suitable for the wide screen. Then, the image data conversion unit 160 performs a processing of generating image data (the image data will be called normal image data, in the following) suitable for the normal screen on the basis of the generated wide image data. Then, the rendering unit 154 performs a rendering processing to the generated wide image data or the generated normal image data, and finally generates images (hereinafter, the image generated on the basis of the wide image data will be called a wide image, while the imaged generated on the basis of the normal image data will be called a normal image) displayed on the display unit 20.

Herein, the game apparatus may have a composition such that whether the wide image is displayed on the display unit 20 or the normal image can be determined on a screen for setting game, that is an option screen, or can be determined on the basis of the operation signal outputted from the input operating unit 10, by a DIP switch or the like of the game apparatus body. In case the display unit 20 outputs a signal indicating the wide screen or the normal screen, the game apparatus may change the images to be generated on the basis of the signal.

Figure 3:
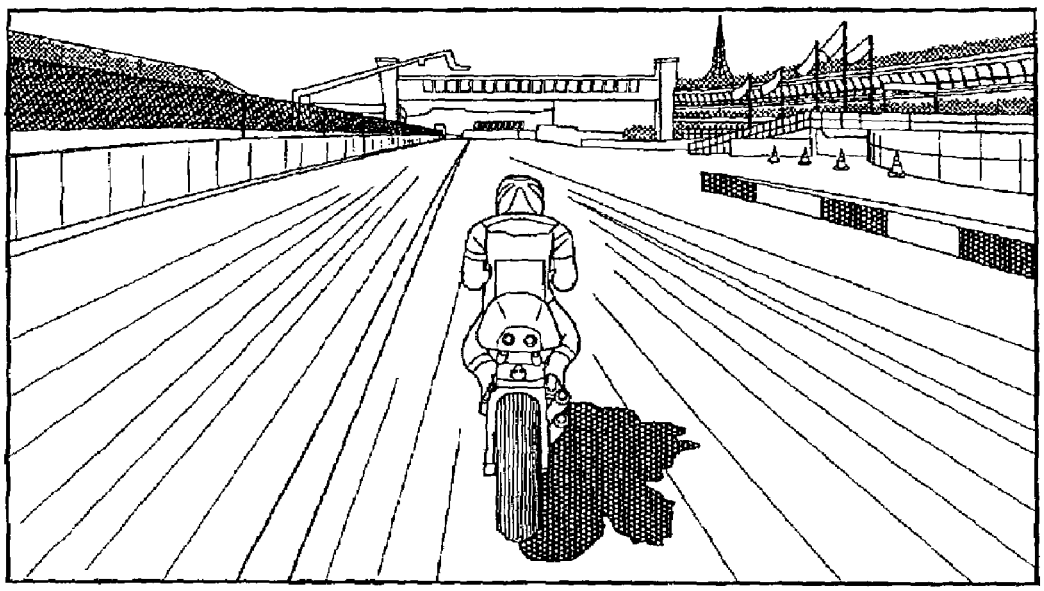
FIG. 3 is a view showing an exemplary screen based on wide image data generated by a wide image data generation unit 152.

The wide image data generation unit 152 performs a processing of generating wide image data by changing the aspect ratio when performing a conventional processing of generating normal image data as the image viewed from the predetermined viewpoint. An exemplary screen based on wide image data generated by the wide image data generation unit 152 is shown in FIG. 3. When generating the wide image data, the wide image data generation unit 152 sets the viewpoint such that the motorcycle (moving object) controlled by the player is located in the center of the screen, and generates the image data. Accordingly, because the right and left ranges (fields of view) wherein the moving object controlled by the player can move are the same as each other, the player can get the presence from the long sideways powerful images.

The image data conversion unit 160 comprises an image position decision unit 162 and an image data operation unit 164.

Figure 4:
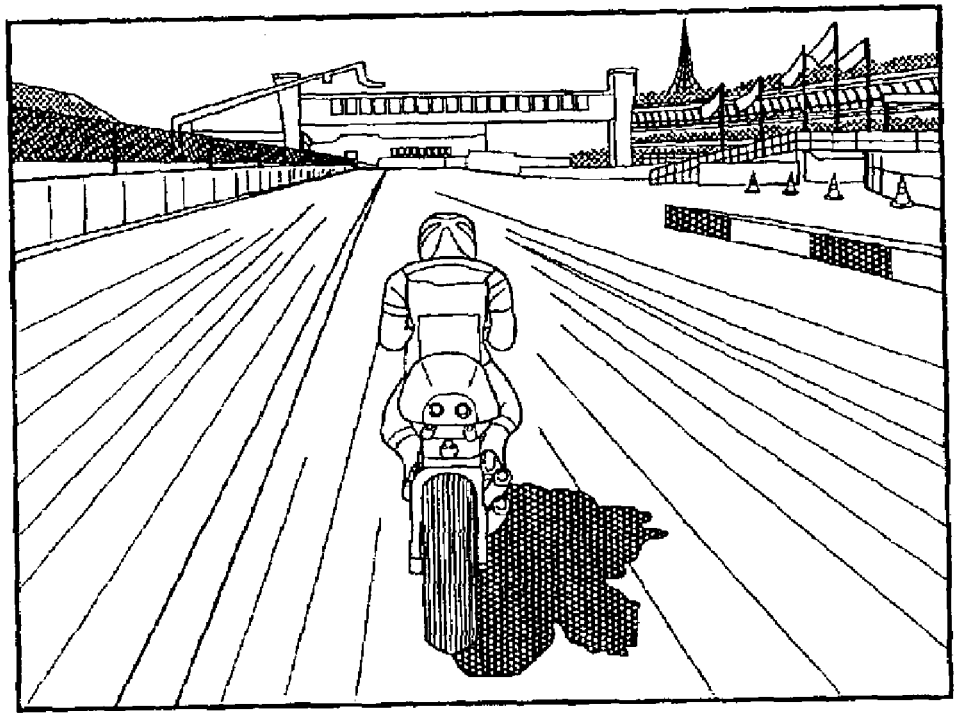
FIG. 4 is a view showing an exemplary screen based on normal image data converted and generated by an image data conversion unit 160.

The image position decision unit 162 performs a processing of deciding an area of the wide image data generated by the wide image data generation unit 152, as the normal image data, and decides the area of the normal image data such that the position of the moving object is located in the center of the screen. An exemplary screen based on the normal image data is shown in FIG. 4.

Figure 5A:
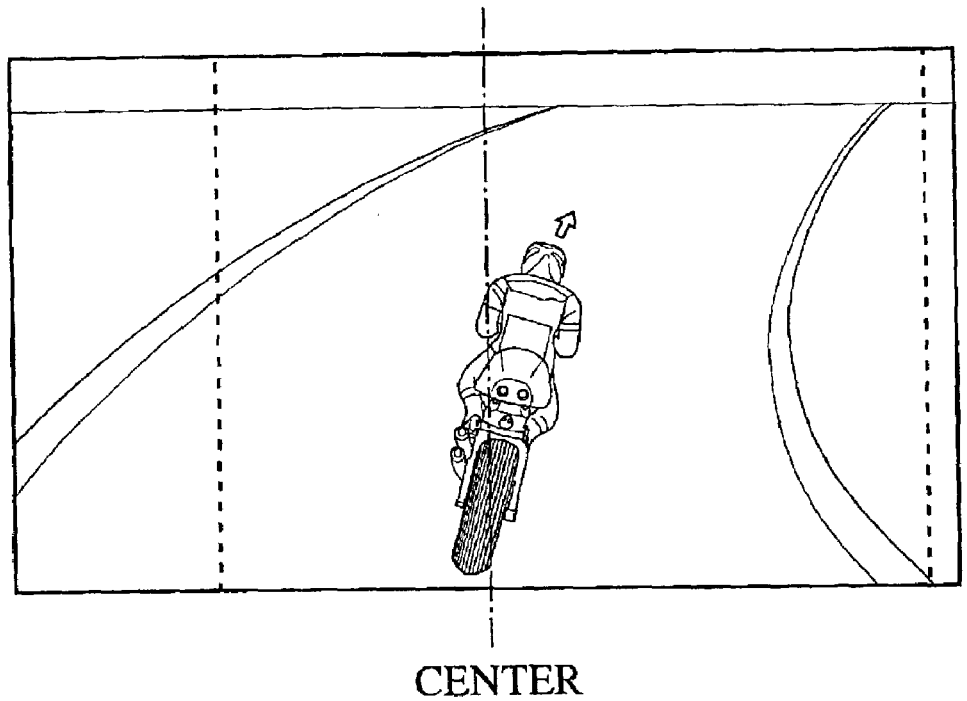
FIGS. 5A and 5B are views for explaining that an area of the normal image data is changed according to a moving direction of a moving object.
Figure 5B:
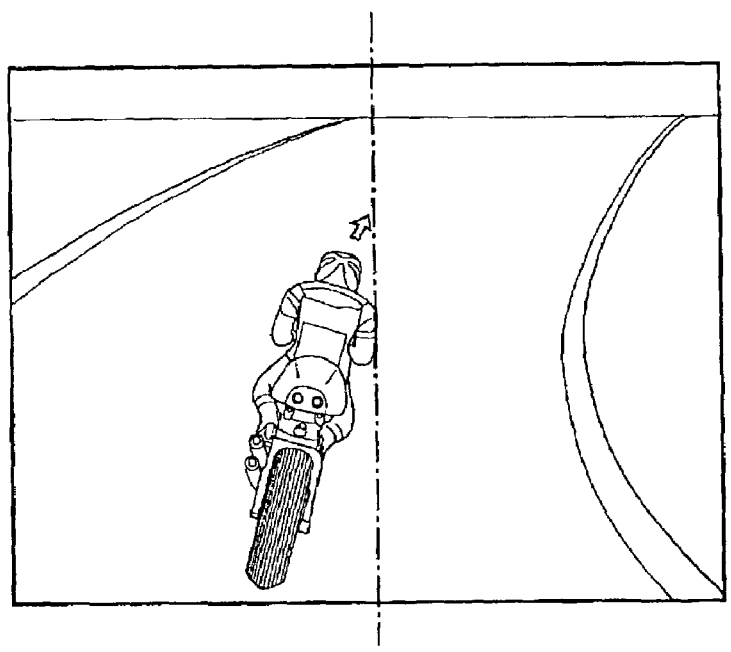

Further, when deciding the area of the normal image data, the image position decision unit 162 may decide the area of the normal image data on the basis of the moving direction of the moving object as well as the position of the moving object. More specifically, as shown in FIG. 5A, although the image position decision unit 162 generates the wide image data such that the moving object is located in the central position of the wide image, the image position decision unit 162 decides the area of the normal image data considering the moving direction of the moving object, indicated by an arrow in FIG. 5A. That is, the image position decision unit 162 changes the area of the normal image data according to the angle of the moving direction of the moving object (practically, according to the amount of right and left operation on the moving object controlled by the player). As shown in FIG. 5B, when the motorcycle (moving object) is moved in the right direction, the image position decision unit 162 may decide the area of the normal image data such that the normal image is generated so as to have the larger right range of vision than the left range of vision. Further, the image position decision unit 162 may consider not only the moving direction of the moving object but also a moving speed or the like. In the abode-described case, the player can get the image as well as the image of the range of vision when driving the motorcycle (moving object), that is, the image of the range of vision according to the moving direction.

Figure 6:
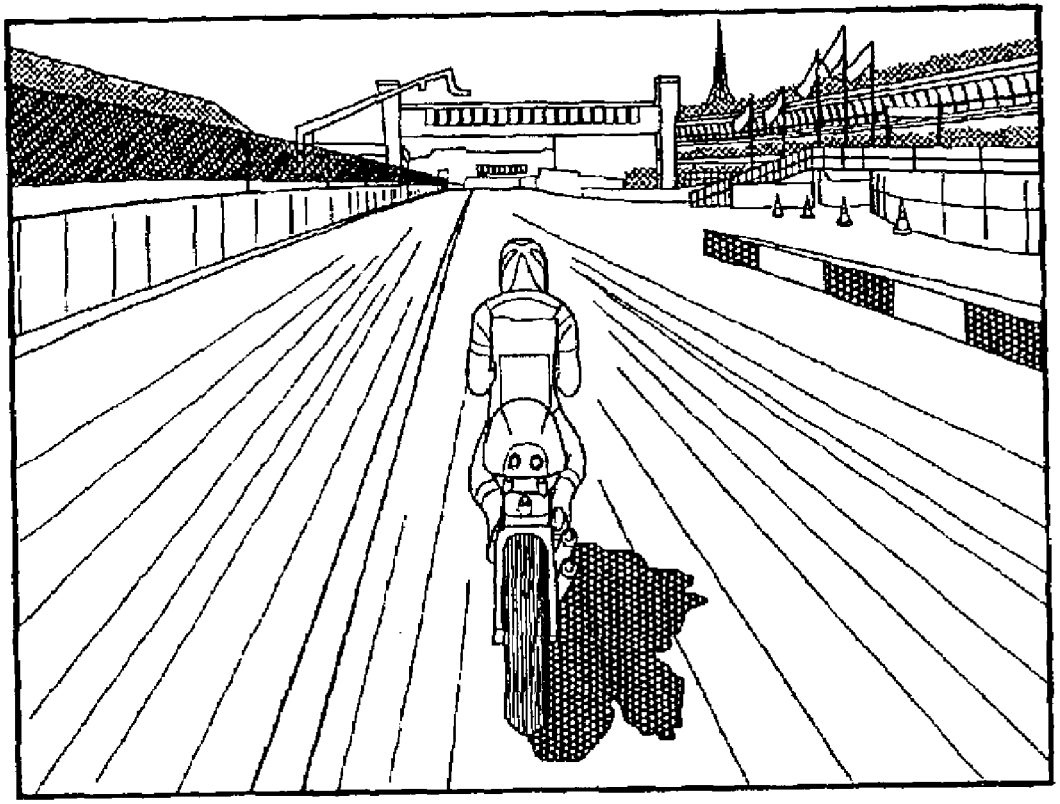
FIG. 6 is a view showing an exemplary case the wide image data is displayed on the normal screen.

The image data operation unit 164 performs a processing of correcting the distortion caused when the wide image is displayed on the normal screen. That is, when the wide image data is outputted in the aspect ratio of the normal screen, the wide image data is reduced laterally and distorted (longitudinally), as shown in FIG. 6. Therefore, the image data operation unit 164 performs the correcting processing. More specifically, the image data operation unit 164 performs the following processing.

Each object in the object space set by the game operation unit 110 is composed as the combination of polygonal figures called polygon. The coordinate values of the polygon are indicated as the relative coordinate values from the predetermined reference point. Therefore, the game operation unit 110 converts to the coordinate values (X, Y, Z, 1) by using the following equation.

$$(X, Y, Z, 1) = (X_0, Y_0, Z_0, 1) \times \begin{bmatrix} M_{00} & M_{01} & M_{02} & 0 \\ M_{10} & M_{11} & M_{12} & 0 \\ M_{20} & M_{21} & M_{22} & 0 \\ M_{30} & M_{31} & M_{32} & 1 \end{bmatrix}$$ [Equation 1]

Herein, the first term of the right side: $(X_0, Y_0, Z_0, 1)$ are coordinates of each vertex of the polygon as a target of conversion, and are coordinates before conversion, and the second term of the right side:

$$\begin{bmatrix} M_{00} & M_{01} & M_{02} & 0 \\ M_{10} & M_{11} & M_{12} & 0 \\ M_{20} & M_{21} & M_{22} & 0 \\ M_{30} & M_{31} & M_{32} & 1 \end{bmatrix}$$ [Equation 2]

is a conversion matrix. Because the wide image displayed on the normal screen is an image generated by laterally reducing the normal image, it is necessary to convert (correct) the lateral elements that are X-coordinate values. Therefore, the image data operation unit 164 performs the matrix operation by using the conversion matrix made by multiplying ($M_{00}$, $M_{10}$, $M_{20}$, $M_{30}$) by 4/3, to convert the coordinate values That is, although the long sideways images are temporarily generated, by multiplying the lateral coordinate values of each polygon by 4/3, the long sideways images are laterally reduced (by 3/4) on the display unit 20 with the normal screen. Accordingly, it is possible the images with no distortion are displayed on the display unit 20 with the normal screen.

Further, when the matrix operation is performed, the brightness of normal image data may be adjusted. That is, for example, in case the brightness of the whole normal screen drops by removing a light source provided at a left edge of the wide image data, from the normal image data, it is possible that the brightness is adjusted.

The image data operation unit 164 may realize the above-described processing performed by the image position deciding unit 162 and the image data operation unit 164, by temporarily storing the wide image data in the memory and performing the matrix operation to the area of the normal image data decided by the image position decision unit 162. Further, in case the time required to store the wide image data in the memory introduces the problem of the game progress, the image data operation unit 164 may directly process the wide image data generated by the wide image data generation unit 152.

Further, the above-described wide image data generation unit 152 and the above-described image data conversion unit 160 may read out the processing program (a wide image data generation program 34 and an image data conversion program 36) for the processing performed by the wide image data generation unit 152 and the image data conversion unit 160 from the data storage medium 30, and may perform the processing according to the processing program. Furthermore, the hardware realizable of the wide image data generation unit 152 and image data conversion unit 160 may perform the processing, by itself.

The data storage medium 30 stores data such as a game program 32 and so on, for the motorcycle racing game, therein. The data storage medium 30 has a function realizable by hardware such as a CD-ROM, a game cassette, an IC card, a MO, a flexible disk, a DVD, a hard disk, a memory and so on. The processing unit 100 performs various processing on the basis of the program and data read out from the data storage medium 30.

Figure 7:
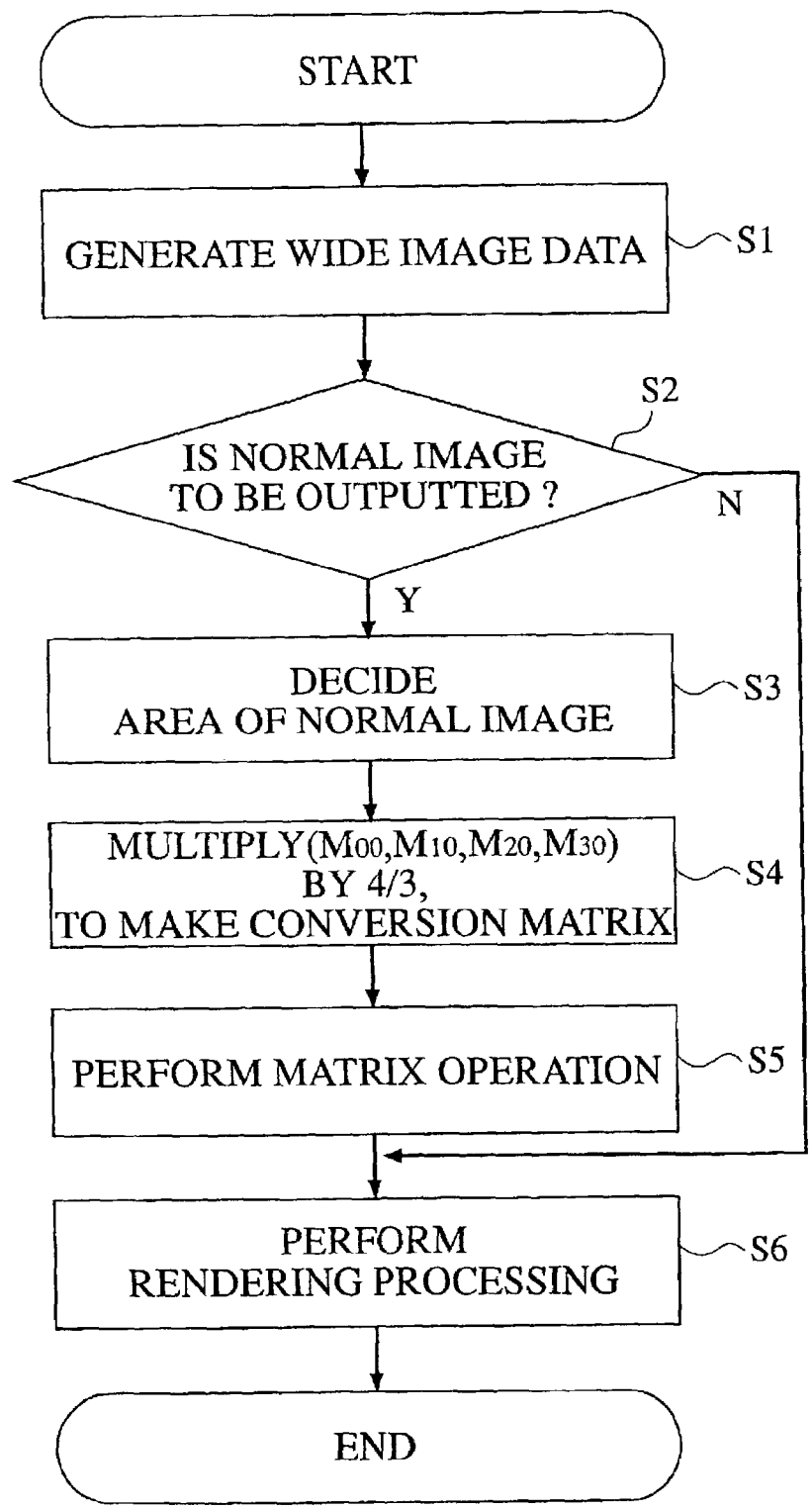
FIG. 7 is a flowchart showing a generation and outputting processing of image data, performed by an image generation unit 150.

Next, a generation and outputting processing of image data, performed by the image generation unit 150 will be explained with reference to FIG. 7.

First, the wide image data generation unit 152 generates image data (wide image data) viewed from the predetermined viewpoint in the object space set by the game operation unit 110, in the aspect ratio corresponding to the wide screen (Step S1).

Then, the image generation unit 150 decides whether the instruction to output the normal image is set on the option screen or the like or not (step S2). When the image generation unit 150 decides that the instruction is set, the image position decision unit 162 of the image data conversion unit 160 performs the processing of deciding an area of the wide image data as the normal image (Step S3). Thereafter, the image data operation unit 164 makes the conversion matrix by multiplying ($M_{00}$, $M_{10}$, $M_{20}$, $M_{30}$) by 4/3 (Step S4), performs the conversion processing of converting the wide image data generated at the Step S1, more specifically, the matrix operation of converting the coordinate positions of each polygon (Step S5), and generates the normal image data.

After the processing at the Step S5, or after the image generation unit 150 decides not to output the normal image, the rendering unit 154 performs the rendering processing to the normal image data generated at the Step S5 or the wide image data generated at the Step S1, and generates the image to be displayed on the display unit 20 (Step S6).

Figure 8:
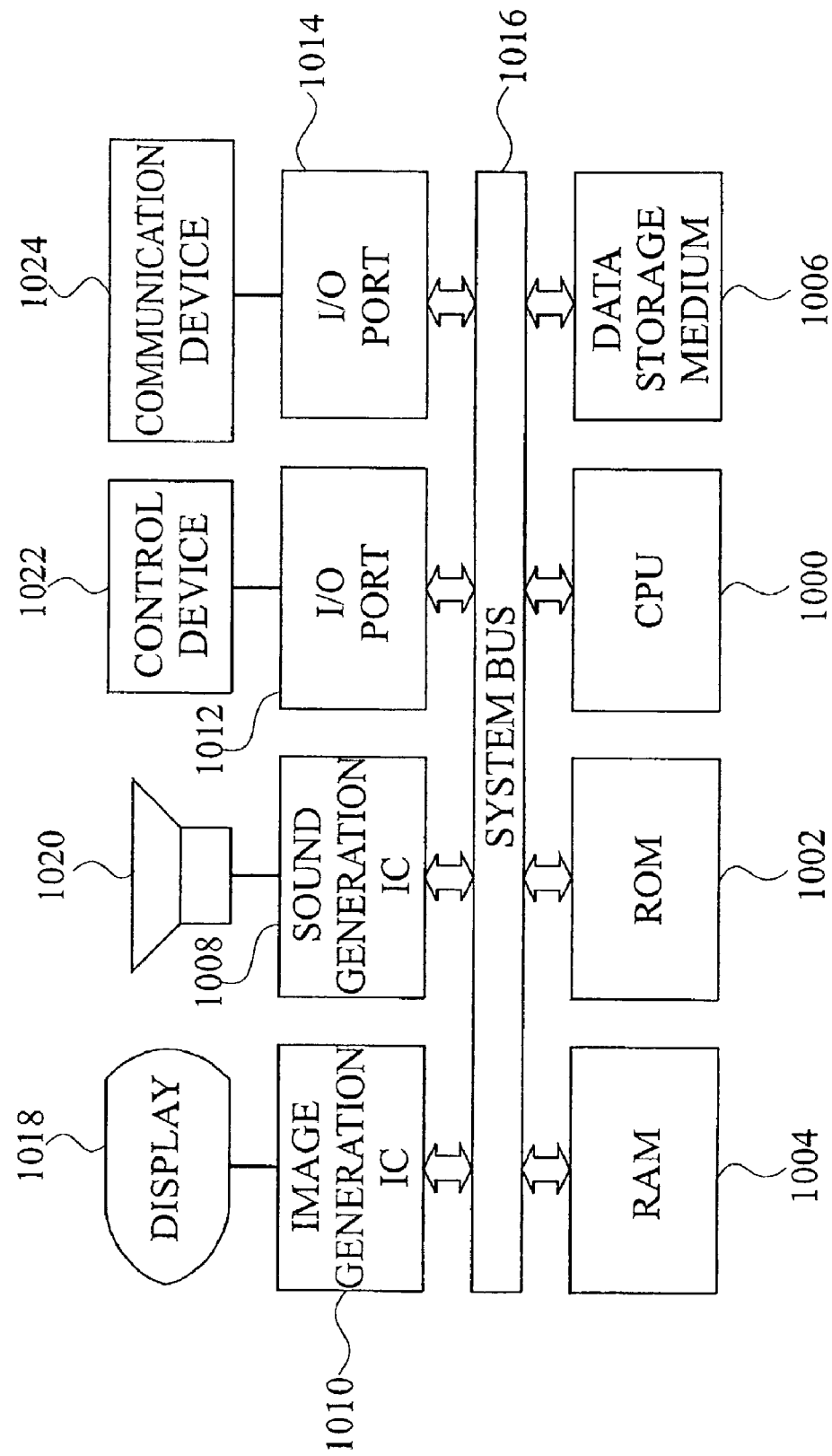
FIG. 8 is a block diagram showing an exemplary hardware configuration realizable of the preferable embodiment of the present invention.

Next, an exemplary hardware configuration realizable of the embodiment of the present invention will be explained with reference to FIG. 8, as follows. The game apparatus as shown in FIG. 8 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween. A display device 1018 is further connected to the image generation IC 1010, a speaker 1020 is further connected to the sound generation IC 1008, a control device 1022 is further connected to the I/O port 1012, and a communication device 1024 is further connected to the I/O port 1014.

The data storage medium 1006 stores primarily a software program, image data for expressing displayed objects, sound data, play data and so on. For example, according to a consumer game machine, a CD-ROM, a game cartridge, a DVD, or other medium is typically used as the data storage medium for storing the game program and other data, and a memory card or other medium is used as the data storage medium for storing the playing data. According to an arcade game machine, a semiconductor memory device such as a ROM or other medium or a hard disk is used as the data storage medium. In the case, the data storage medium 1006 can be achieved in the ROM 1002.

The control device 1022 is equivalent to the game controller, an operation panel or the like. Further, the control device 1022 is a device for inputting results a user decides while playing the game, to the apparatus body.

The CPU 1000 controls the overall of the game apparatus and processes various data according to the game program stored to the data storage medium 1006, the system program (initialization data for the game apparatus and so on) stored to the ROM 1002, signals inputted by the control device 1022, or the like. The RAM 1004 is a storage means used as an operating memory by the CPU 1000. Further, the RAM 1004 stores the particular contents of the data storage medium 1006 or the ROM 1002, operating results from the CPU 1000, or the like.

The sound generation IC 1008 and the image generation IC 1010 are also disposed in this type of game apparatus to generate and output sounds and images appropriate to the game. The sound generation IC 1008 is an integrated circuit for generating game sounds such as sound effects, background music and so on, on the basis of the data stored to the data storage medium 1006 or the ROM 1002. The game sounds generated by the sound generation IC 1008 are outputted from the speaker 1020. The image generation IC 1010 is an integrated circuit for generating pixel data to be outputted to the display device 1018, on the basis of the image data received from the RAM 1004, the ROM 1002, the data storage medium 1006, or the like. The display device 1018 needs to comprise a light emission function, and for example, a CRT, a LCD, a plasma display or the like is suitable to the display device 1018.

The communication device 1024 is for communicating various data used by the game apparatus with an external device. If the game apparatus is connected with another game apparatus, the communication device 1024 is used for communicating game programs, predetermined data corresponding to game programs, or other data with another game apparatus, through a communications line.

Various types of processing of generating game images or the like according to the aspect ratio of the screen, are achieved by the data storage medium 1006 which stores the game program 32, and the CPU 1000, the image generation IC 1010, the sound generation IC 1008 and so on which operates according to the program. The processing accomplished by the image generation IC 1010, the sound generation IC 1008, or the like, can be written as software applications run by the CPU 1000, a general purpose DSP, or other such device.

Further, the wide image data generation unit 152 and the image data conversion unit 160 of the functional block shown in FIG. 2 may be composed as attachments consisting of a board, an IC and so on, separated from the game apparatus, so as to be attachable to and detachable from the game apparatus according to the needs of the player, that is, according as which aspect ratio is used.

Figure 9:
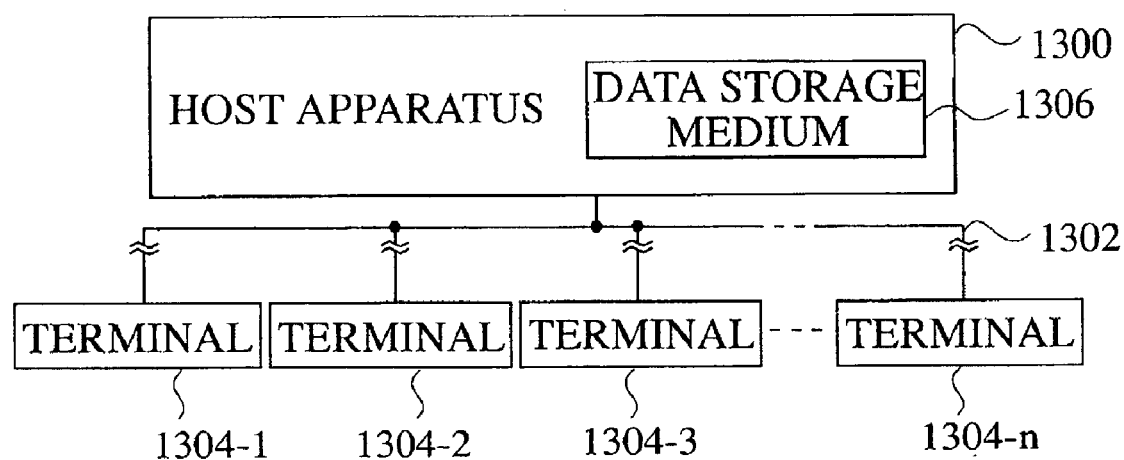
FIG. 9 is a view showing an exemplary case the preferable embodiment of the present invention is applied to a game terminal connected to a host apparatus through a communication line.

FIG. 9 shows an exemplary case wherein the embodiment of the present invention is applied to a game system comprising a host apparatus 1300 and terminals 1304-1 to 1304-n connected to the host apparatus 1300 through a network 1302.

According to the game system, the game program 32, the wide image data generation program 34, and the image data conversion program 36 are stored, for example, in a data storage medium 1306 under control of the host apparatus 1300, such as a magnetic disk device, a magnetic tape device, a memory, or the like. In case each of terminals 1304-1 to 1304-n comprises a CPU, an image generation IC and a sound generation IC and can generate game images and game sounds with standing alone, the host apparatus 1300 sends the game program 32 and so on to each of terminals 1304-1 to 1304-n through the communication line 1302, at requests of each of terminals 1304-1 to 1304-n. Further, the host apparatus 1300 sends the wide image data generation program 34 and the image data conversion program 36 to each of terminals 1304-1 to 1304-n, according to the aspect ratio of the screen used at each of terminals 1304-1 to 1304-n. On the other hand, in case each of terminals 1304-1 to 1304-n cannot generate game images and game sounds with standing alone, the host apparatus 1300 generates game images and game sounds, to send them to each of terminals 1304-1 to 1304-n. Therefore, each terminal outputs the game images and the game sounds.

As described above, according to the present invention, it is possible to provide the game apparatus which can generate and output game images corresponding the wide screen, and also generate and output game images which are not distorted corresponding to the normal screen.

It should also be understood that the present invention is not limited to the above-described embodiment and various changes and modifications may be made to the invention without departing from the gist thereof. For example, it is possible that the present invention is applied not only to the motorcycle racing game but also to the others racing games such as a car racing game, a sports game, an action game, a roll playing game, an adventure game, a shooting game and so on. That is, because the gist of the present invention is to provide powerful game images which are long sideways according to the wide screen, and to provide game images which are not distorted for the conventional normal screen, it is possible that the present invention is applied to various types of games without departing from the gist thereof.

Further, although it has been explained that the generation and output of wide image data and the generation and output of normal image data are switched on the so-called option screen or by the DIP switch of the game apparatus body, the processing unit 100 shown in FIG. 2 may comprise a switching unit as the functional block, and the switching unit may switch the generation and output of image data according to the type or the progress of the game.

That is, the switching unit may switch such that the wide image data is generated without generating the normal image data, for the game requiring the amount equal to (screen) information of the wide image data even if the game images are reduced laterally, such as game images of a puzzle game, a shooting game and so on, or the wide image data is outputted without converting according to the progress of the game, in order to provide images of a winning run after one race finishes or effects that the level of the difficulty in operating raises by intentionally providing images which is hard to be seen.

Further, according to the operation using the conversion matrix, although it has been explained that the operation of multiplying the coordinates ($M_{00}$, $M_{10}$, $M_{20}$, $M_{30}$) of the conversion matrix by 4/3 is performed to convert (correct) the lateral coordinate values (X-coordinate values), the operation of multiplying the coordinates ($M_{01}$, $M_{11}$, $M_{21}$, $M_{31}$) of the conversion matrix by ¾ may be performed to reduce the longitudinal coordinate values (to widen the longitudinal view angle). That is, although the wide image data reduced longitudinally is generated by the present operation, because the wide image data is laterally reduced (by ¾) on the display unit 20 with the normal screen, the image, which is not distorted as whole, is displayed finally.

Figure 10:
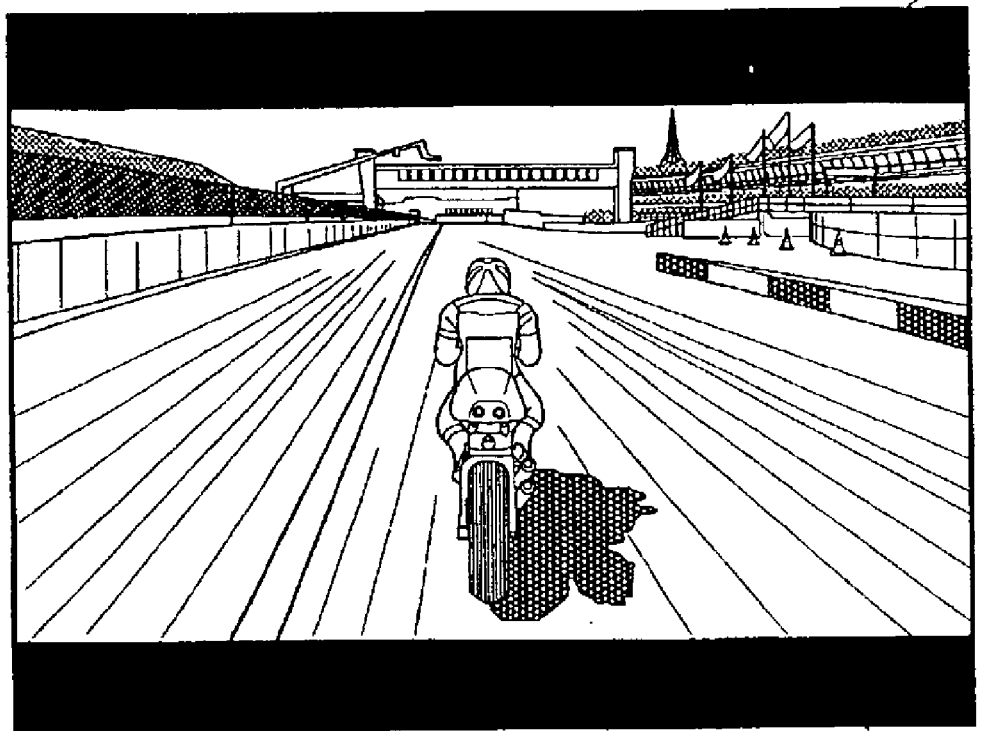
FIG. 10 is a view showing an exemplary display of the wide image data in a letter box form, on the normal screen.

Furthermore, although it has been explained that the wide image data is generated to display on the wide screen first, and then converted to the image data corresponding to the normal screen, according to the above-described embodiment, the wide image data may be displayed in the so-called letter box form on the normal screen, and then converted to display on the wide screen. FIG. 10 is a view showing an exemplary normal screen based on wide image data in a letter box form.

As the method realizable as described above, the wide image data is displayed in the letter box form on the normal screen. Further, the wide image data in the letter box is operated by the conversion matrix made by multiplying the coordinates ($M_{01}$, $M_{11}$, $M_{21}$, $M_{31}$) by 4/3, for the wide screen. That is, the longitudinally long wide image data is temporarily generated when the conversion matrix is operated. However, because the wide image data is in the letter box form, the wide image data is reduced (by 3/4) longitudinally on the basis of the lateral size, to be displayed on the wide screen. Therefore, it is possible to generate the image with no distortion on the wide screen. Further, because blank portions 22 of the image data generated in the letter box form are removed, it is possible to display the wide image data with the same view angle on both normal screen and wide screen.

The switching unit for switching image data according to the type and the progress state of the game, explained as the modification, may switch between the display of the wide image data in the letter box form and the display on the wide screen.

Furthermore, although it has been explained that the display unit is a display on which the game images are displayed for a player according to the above-described embodiment, the display unit may be a relay monitor of an arcade game machine or the like, on which images are displayed while the player is playing the game. In the above-described case, the display unit is realizable by individually comprising an image generation unit for performing a processing for the display unit for the player and an image generation unit for performing a processing for the relay monitor.

Figure 11A:
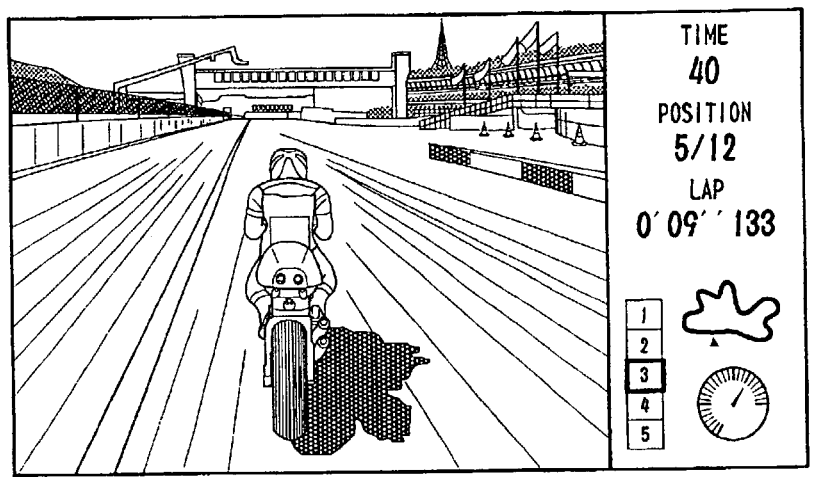
FIGS. 11A, 11B and 11C are views for explaining that a game data is extracted from the wide image data, to generate the normal image data.
Figure 11B:
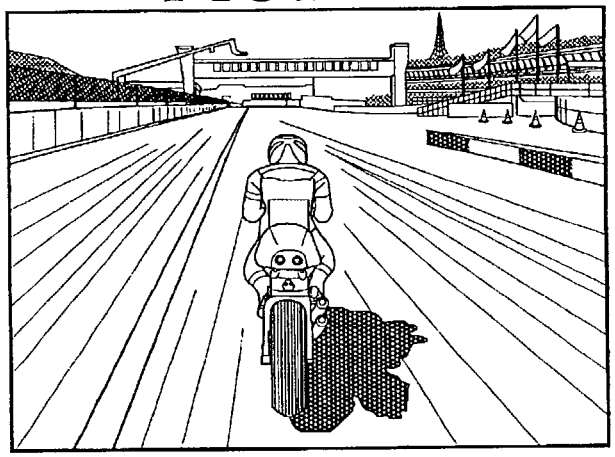
Figure 11C:
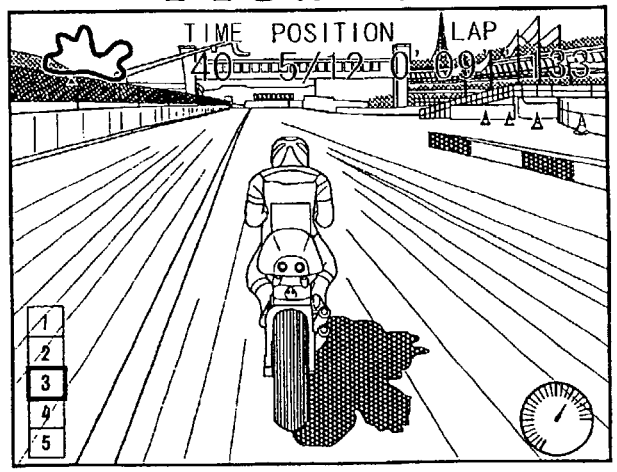

Furthermore, although it has been explained that the wide image data generation unit 152 generates the wide image data according to the above-described embodiment, the wide image data generation unit 152 may generate the normal image data and game data such as play data and so on, and may display them. That is, as shown in FIG. 11A, the normal image data and the data (a meter, a ranking, a lap time and so on) for the present game play may be displayed on the wide screen, and as shown in FIG. 11B, only the normal image data may be displayed on the normal screen. Further, as shown in FIG. 11C, the data for the present game play may be put on the normal image data, to be displayed together on the normal screen.

INDUSTRIAL APPLICABILITY

According to the present invention, it is possible to generate game images corresponding to the wide screen, and also to generate game images with no distortion corresponding to the normal screen. Further, it is possible to display the game images with the same view angle on the normal screen and the wide screen. Accordingly, the present invention is suited for various types of game apparatuses, storage mediums, transmission mediums and computer programs, for displaying game images on the predetermined display units in various aspect ratios.

The invention claimed is:

1. A game apparatus comprising:
an operation input section;
a character control section for controlling a character according to operation input to the operation input section by a player, the character being arranged in a game space;
a first generating section for generating game image data of the game space corresponding to a wide screen; and
a second generating section for extracting an area based on a moving direction or an eyes direction of the character in the game image data as game image data corresponding to a normal screen, from the game image data generated by the first generating section, to generate the game image data with no distortion corresponding to the normal screen.

2. The game apparatus as claimed in claim 1, wherein the second generating section extracts the game image data corresponding to the normal screen from the game image data generated by the first generating section such that the game image data corresponding to the normal screen has an area between one end of the normal screen and the character that is larger than an area between an other end of the normal screen and the character based on the moving direction or an eyes direction of the character in the game image data generated by the first generating section.

3. The game apparatus as claimed in claim 2, wherein the one end is an end of the normal screen on a side of moving direction of the character, and the second generating section extracts the game image data corresponding to the normal screen from the game image data generated by the first generating section so that one range of the area on the side of the moving direction of the character is made to be larger than the other range of the area on a side opposite to the moving direction.

4. The game apparatus as claimed in claim 1, further comprising a switching section for switching between the game image data generated by the first generating section and the game image data generated by the second generating section, to output either the game image data generated by the first generating section or the game image data generated by the second generating section.

5. The game apparatus as claimed in claim 4, wherein the switching section automatically switches the game image data to be outputted, according to a signal outputted from a predetermined display section.

6. The game apparatus as claimed in claim 4, wherein the switching section switches the game image data to be outputted, according to a type or a state of a progress of a game.

7. The game apparatus as claimed in claim 1, further comprising an adjusting section for adjusting a brightness of the game image data generated by the second generating section, based on the game image data generated by the first generating section.

8. The game apparatus as claimed in claim 1, further comprising an external output section for outputting the game image data generated by the first generating section or the game image data generated by the second generating section, to a predetermined external display section connected to the game apparatus.

9. A computer-readable storage medium storing a program for generating image data, the program comprising:
an operation input code;

a character control code for controlling a character according to operation input to the operation input code by a player, the character being arranged in a game space;

a first generating code for generating game image data of the game space corresponding to a wide screen; and a second generating code for extracting an area based on a moving direction or an eyes direction of the character in the game image data as game image data corresponding to a normal screen, from the game image data generated by the first generating code, to generate the game image data with no distortion corresponding to the normal screen.

10. The storage medium storing the program, as claimed in claim 9, wherein the second generating code extracts the game image data corresponding to the normal screen from the game image data generated by the first generating code such that the game image data corresponding to the normal screen has an area between one end of the normal screen and the character that is larger than an area between an other end of the normal screen and the character based on the moving direction or an eyes direction of the character in the game image data generated by the first generating code.

11. The storage medium storing the program, as claimed in claim 10, wherein the one end is an end of the normal screen on a side of moving direction of the character, and the second generating code extracts the game image data corresponding to the normal screen from the game image data generated by the first generating code so that one range of the area on the side of the moving direction of the character is made to be larger than the other range of the area on a side opposite to the moving direction.

12. A transmission medium transmitting a program for generating image data, the program comprising:

an operation input code;

a character control code for controlling a character according to operation input to the operation input code by a player, the character being arranged in a game space;

a first generating code for generating game image data of the game space corresponding to a wide screen; and a second generating code for extracting an area based on a moving direction or an eyes direction of the character in the game image data as game image data corresponding to a normal screen, from the game image data generated by the first generating code, to generate the game image data with no distortion corresponding to the normal screen.

13. The transmission medium transmitting the program, as claimed in claim 12, wherein the second generating code extracts the game image data corresponding to the normal screen from the game image data generated by the first generating code such that the game image data corresponding to the normal screen has an area between one end of the normal screen and the character that is larger than an area between an other end of the normal screen and the character based on the moving direction or an eyes direction of the character in the game image data generated by the first generating code.

14. The transmission medium transmitting the program, as claimed in claim 13, wherein the one end is an end of the normal screen on a side of moving direction of the character, and the second generating code extracts the game image data corresponding to the normal screen from the game image data generated by the first generating code so that one range of the area on the side of the moving direction of the character is made to be larger than the other range of the area on a side opposite to the moving direction.

* * * * *